US00RE35273E

United States Patent [19]

Thompson

[11] E Patent Number: Re. 35,273

[45] Reissued Date of Patent: Jun. 11, 1996

[54] MANIFOLD FORM ASSEMBLY

[76] Inventor: Gary J. Thompson, 2610 Brookdale, Green Bay, Wis. 54303

[21] Appl. No.: 416,143

[22] Filed: Apr. 4, 1995

Related U.S. Patent Documents

Reissue of:

[64] Patent No.: 4,762,342
Issued: Aug. 9, 1988
Appl. No.: 121,522
Filed: Nov. 17, 1987

U.S. Applications:

[63] Continuation-in-part of Ser. No. 921,964, Oct. 22, 1986, Pat. No. 4,715,620.

[51] Int. Cl.[6] ..... B41L 1/20; B41L 1/16; B41M 5/10

[52] U.S. Cl. ..... 462/55; 462/18; 427/153

[58] Field of Search ..... 462/1, 18, 55; 427/153, 152; 503/206; 283/58, 59, 66.1, 66.2, 60.1, 60.2, 42, 48.1

[56] References Cited

U.S. PATENT DOCUMENTS

| | | |
|---|---|---|
| Re. 30,041 | 7/1979 | Maalouf . |
| Re. 30,116 | 10/1979 | Maalouf . |
| 1,980,318 | 11/1934 | Caton . |
| 2,194,670 | 3/1940 | Neu . |
| 2,470,586 | 5/1949 | Tathwell . |
| 2,802,678 | 8/1957 | Bright . |
| 2,869,898 | 1/1959 | Martin . |
| 3,625,547 | 12/1971 | Burke . |
| 3,981,523 | 9/1976 | Maalouf . |
| 4,000,916 | 1/1977 | Lucas . |
| 4,036,511 | 7/1977 | Maalouf . |
| 4,121,857 | 10/1978 | Halse . |
| 4,126,334 | 11/1978 | Van Malderghem . |
| 4,143,891 | 3/1979 | Neubauer . |
| 4,165,101 | 8/1979 | Sternberg . |
| 4,168,851 | 9/1979 | Halse . |
| 4,178,018 | 12/1979 | Halse . |
| 4,407,524 | 10/1983 | Trautlein . |
| 4,448,445 | 5/1984 | Chang . |
| 4,533,160 | 8/1985 | Malone . |
| 4,576,399 | 3/1986 | White et al. . |
| 4,583,765 | 4/1986 | Messinger . |
| 4,614,362 | 9/1986 | Breen et al. . |
| 4,614,363 | 9/1986 | Breen . |
| 4,722,553 | 2/1988 | Evans . |

FOREIGN PATENT DOCUMENTS

| | | |
|---|---|---|
| 128558 | 6/1963 | New Zealand . |
| 128915 | 3/1964 | New Zealand . |
| 185282 | 11/1980 | New Zealand . |
| 2085359 | 10/1980 | United Kingdom . |

OTHER PUBLICATIONS

"Flip–N–Rite The Patented Form", *Form,* (Feb. 1989), pp. 74–78.

"Transfers Writing Front and Back", *Business Forms, Labels & Systems,* (Jul. 1990), p. 48.

*Primary Examiner*—Frances Han
*Attorney, Agent, or Firm*—Andrus, Sceales, Starke & Sawall

[57] ABSTRACT

A manifold form assembly has a front page and a back page, with each page having at least one image-receiving area disposed thereon. The original front page is disposed on one side of a first sheet and the original back page is disposed on the other side of the first sheet. The first sheet is movable between a first position in which the original front page is exposed for completion and a second position in which the original back page is exposed for completion. A pressure sensitive image-transferring system is provided integral with the assembly to transfer pressure-created images formed on the front and back page image-receiving areas. Duplicate front and back pages receive images transferred by the image-transferring system. A stub connects the original pages, the image-transferring system, and the duplicate pages into an integral form assembly. In one embodiment, a set of carbons transfer the pressure-created images from the original front sheet to the duplicate front sheets. The carbons are then removed and the first sheet is moved to its second position to expose the original back page. A carbonless system is provided between the original and duplicate sheets to transfer the pressure-created images from the original back page to the duplicate back pages.

1 Claim, 4 Drawing Sheets

MANIFOLD FORM ASSEMBLY

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of application Ser. No. 06/921,964 filed Oct. 22, 1986 now U.S. Pat. No. 4,715,620, issued on Dec. 29, 1987.

BACKGROUND OF THE INVENTION

This invention relates to business forms, and in particular to a manifold business form which provides a plurality of copies of a completed form.

Because of the length and complexity of some business forms, it is sometimes impossible to provide a one-page form containing all the necessary printing and blank areas for completion. This results in such forms being printed in a two-page format. When the two pages of the form are on separate sheets, a standard carbon or carbonless image-transferring system can be used to create multiple copies of each completed page. Upon completion, the copies Of each page are joined in sets to provide multiple copies of the original two-page completed document. This construction is cumbersome, and can result in incomplete sets of copies if one of the pages is somehow separated from the set.

Alternatively, the form can be printed so that the two pages are on opposite sides of a single sheet. In the past, one of the necessary steps in completing a form of this type has been to manually place carbon sheets between the sheets of the form to ensure that the images imprinted on the original pages are transferred to the copies. The manual placement of carbon sheets is a messy and awkward process, involving the possibility that the carbon sheets may be incorrectly placed. Such incorrect placement of carbon sheets can result in omission of some or all imprinted information from the copies.

Thus, there is a need for a manifold form assembly which allows use of a two-sided original form without the need for manual placement of carbon sheets when filling out the form.

SUMMARY OF THE INVENTION

In accordance with one aspect of the invention, an integral form assembly is provided with an original front page having at least one image-receiving area, and an original back page having at least one image-receiving area.

In one embodiment, the original front and back pages are disposed on opposite sides of a first sheet. The first sheet is movable between a first position in which the original front page is exposed and a second position in which the original back page is exposed.

In accordance with another aspect of the invention, a pressure sensitive image-transferring means is provided for transferring pressure-created images formed on the image-receiving areas. The image-transferring means is integral with the form assembly.

in accordance with yet another aspect of the invention, a duplicate front page and duplicate back page are provided. The duplicate front and back pages have image-receiving areas corresponding to those on the original front and back pages, for receiving pressure-created images transferred by the image-transferring means.

In accordance with yet another aspect of the invention, a binder is provided for connecting the front and back pages, the image-transferring means, and the duplicates into an integral form assembly.

The present invention thus provides a manifold form assembly for providing a completed original front page and a completed original back page, and for providing a copy of each on the duplicate front page and duplicate back page, respectively. The front and back pages can be completed, and the copies made, without the need for manual insertion of carbon papers.

The invention also contemplates a method of creating an original two-sided document utilizing and one or more two-sided copies of the original document the above-noted aspects of the form assembly of the invention.

BRIEF DESCRIPTION OF THE DRAWINGS

The drawings illustrate the best mode presently contemplated of carrying out the invention.

In the drawings:

Figure 1:
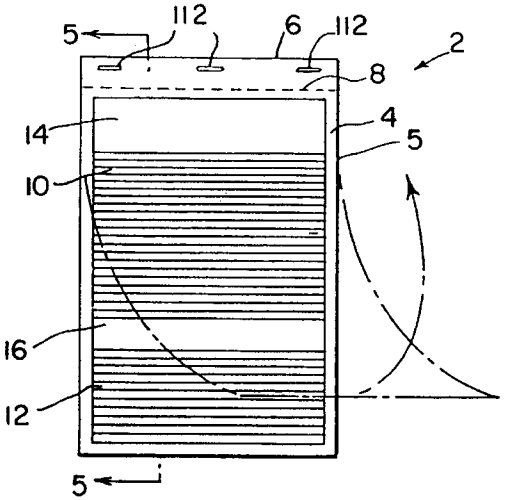
Figure 5:
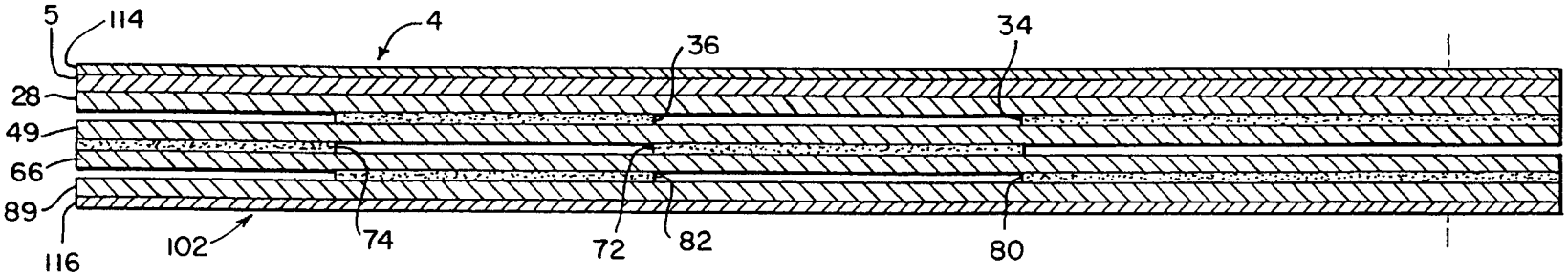
Figure 6:
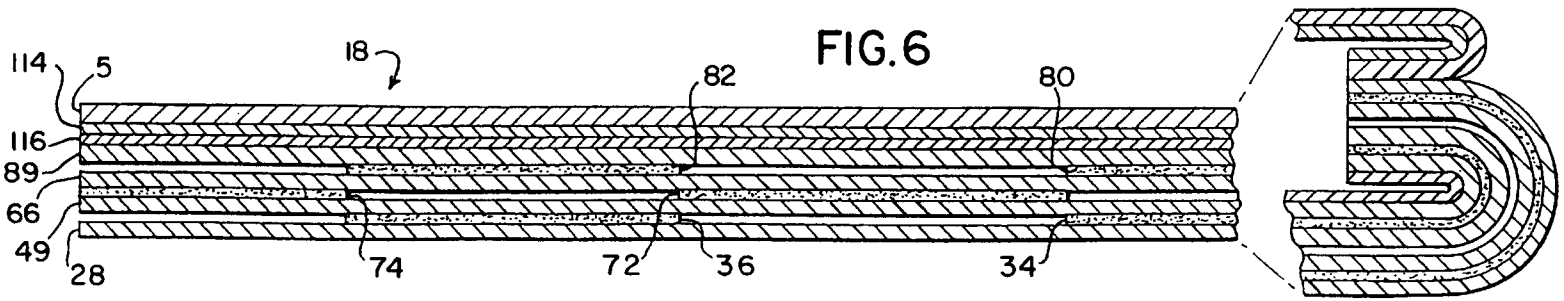
Figure 3:
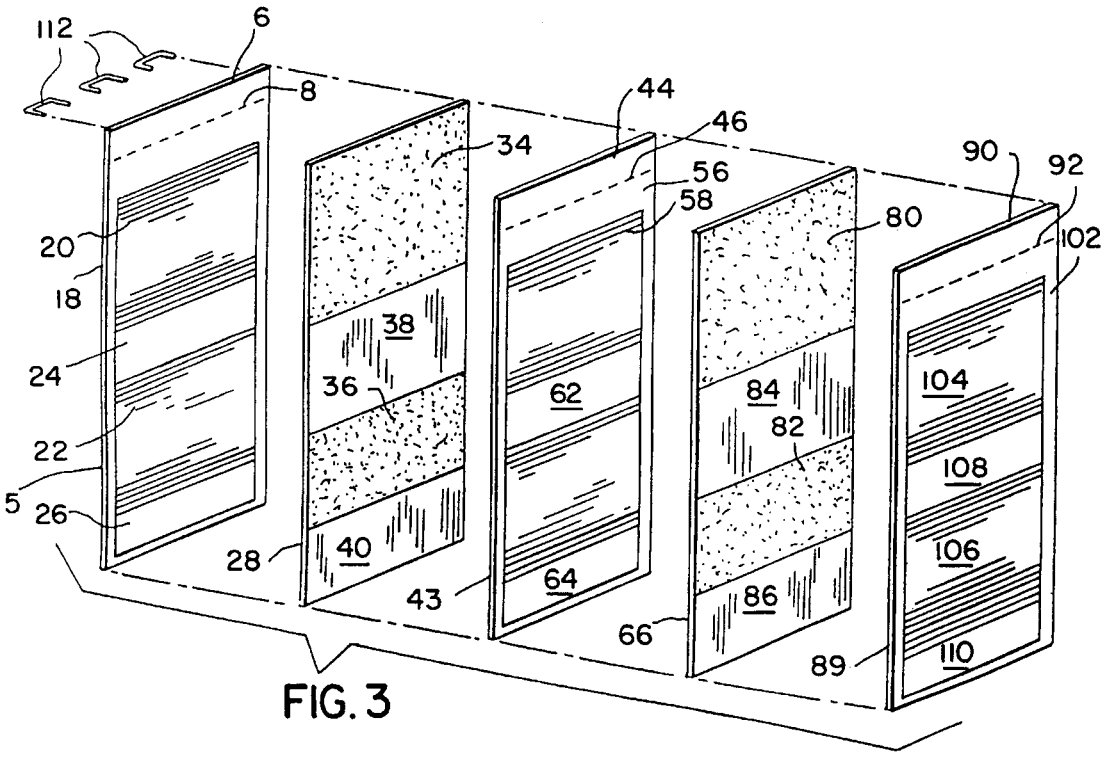
Figure 7:
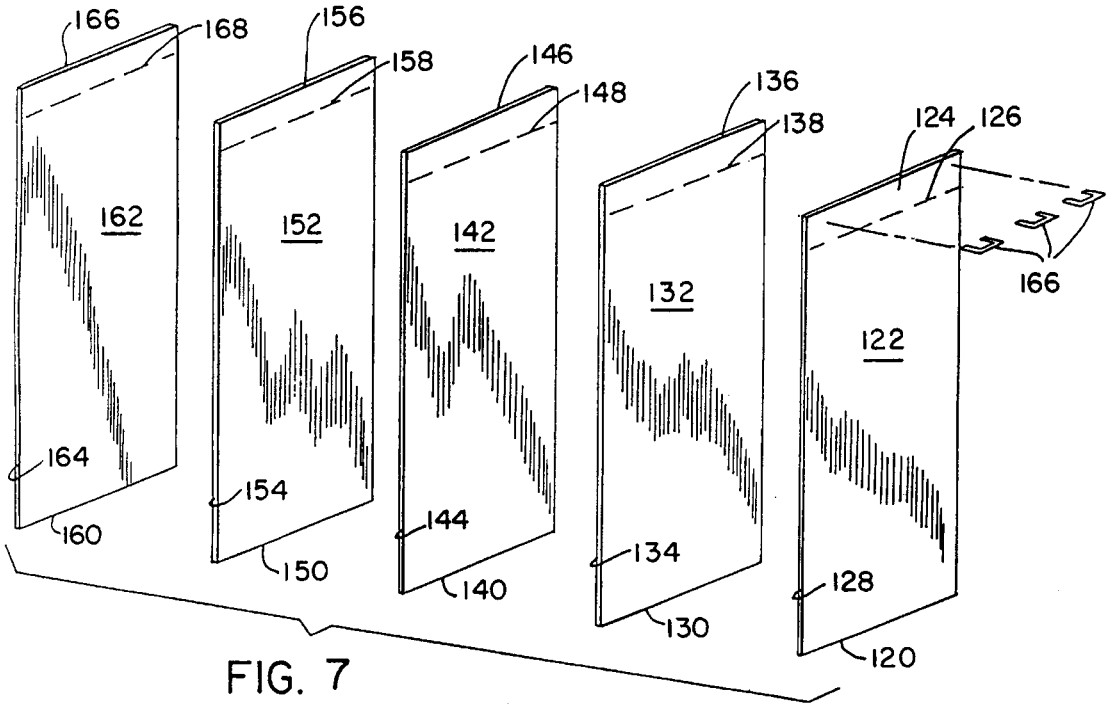
Figure 8:
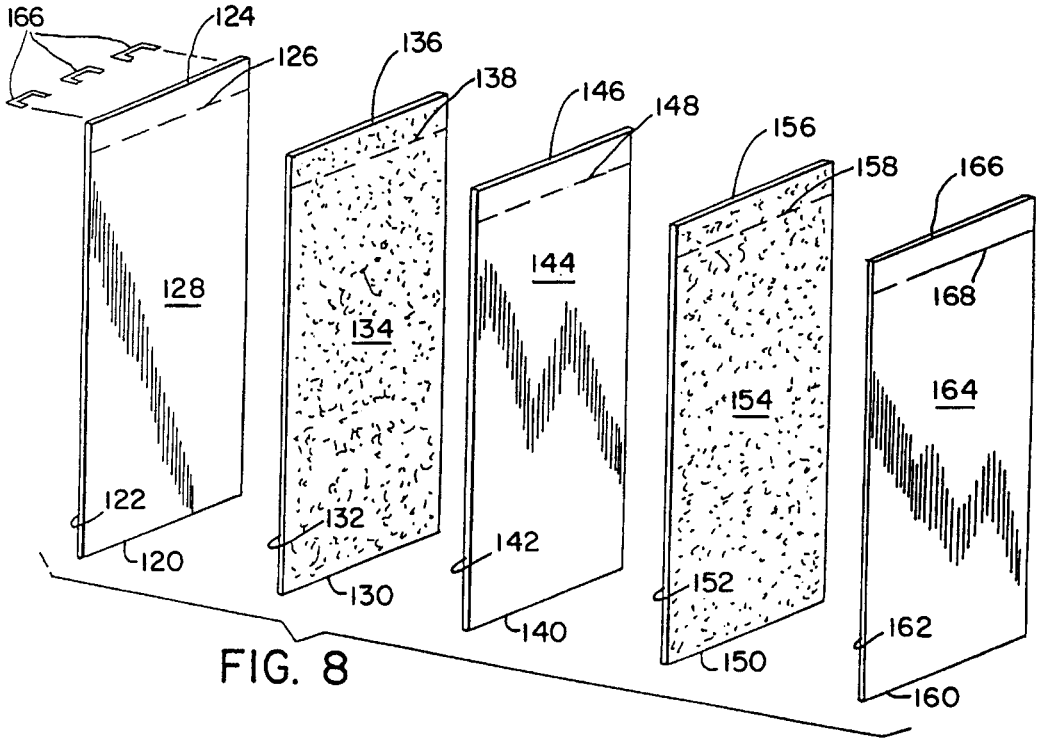
Figure 9:
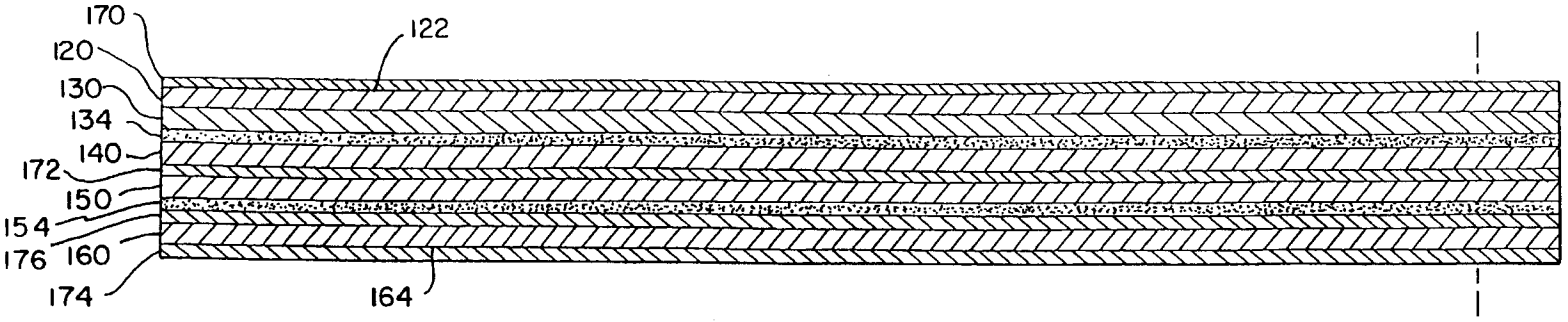
Figure 10:
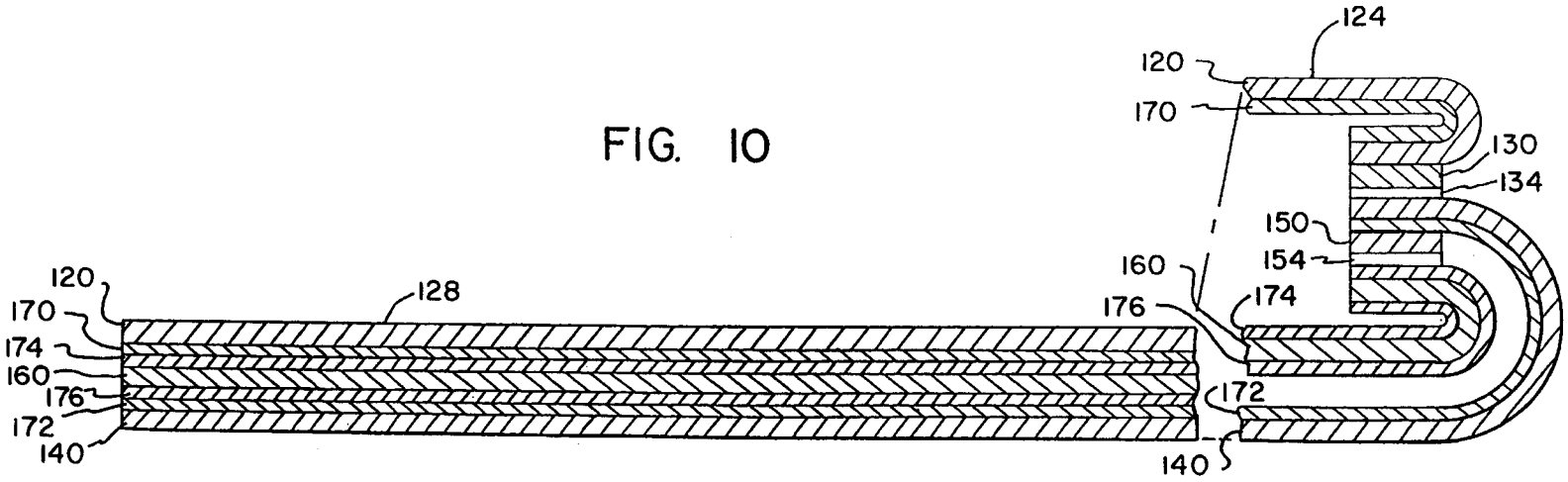

FIG, 1 is a plan view of the manifold form assembly of the present invention with the front page exposed for completion, with phantom lines showing how the front page is moved to expose the back page for completion:

FIG, 2 is an exploded perspective view showing the front side of the components of the form assembly of FIG. 1;

FIG. 3 is an exploded perspective view, showing the back side of the components of the form assembly of FIG. 1;

FIG, 4 is a detailed side view of the upper portion of the form assembly of FIG. 1, showing the original back page exposed for completion;

FIG. 5 is a sectional view of the form assembly taken generally along line 5—5 of FIG. 1;

FIG. 6 is a sectional view of the form assembly of FIG. 5, in which the sheet containing the original front and back pages has been flipped to expose the back page for completion;

FIG. 7 is an exploded perspective view showing the front side of the components of an alternate form assembly constructed according to the invention;

FIG. 8 is an exploded perspective view showing the back side of the components of the form assembly of 7;

FIG. 9 is a sectional view similar to FIG. 5 of the form assembly of FIGS. 7 and 8; and FIG. 10 is a sectional view similar to FIG. 6 of the form assembly of FIGS. 7 and 8, in which the sheet containing the original front and back pages has been flipped to expose the back page for completion.

DETAILED DESCRIPTION OF THE PREFERRED EMBODIMENT

As shown in FIG. 1, a manifold form assembly 2 is provided with an original front page 4 on a first sheet 5 detachably connected to stub 6 along a perforation 8. Front page 4 is a business form having written or printed material thereon, shown at 10, 12. Front page 4 further has blank image-receiving areas 14, 16 to receive pressure-created images formed by writing or typing, for completing front page 4.

Referring to FIG. 3, an original back page 18 is provided on the other side of sheet 5. Original back page 18 has areas of written or printed material 20, 22, as well as blank image-receiving areas 24, 26, Back page image-receiving areas 24, 26 are non-overlapping with front page image-receiving areas 14, 16 on the opposite side of sheet 5.

A first carbon sheet 28 is provided directly behind and aligned with sheet 5. The side of carbon sheet 28 adjacent original back page 18 has no exposed carbon areas. As shown in FIG. 3, the other side of carbon sheet 28 is provided with selective pressure sensitive exposed carbon areas 34, 36 and blank areas 38, 40. Exposed carbon areas 34, 36 encompass and correspond to image-receiving areas 14, 16 on original front page 4, to transfer pressure-created images formed on image-receiving areas 14, 16.

A duplicate front page 42 and a duplicate back page 56 are provided on opposite sides of a duplicate sheet 43, which is positioned behind and aligned with carbon sheet 28. Duplicate sheet 43 is detachably connected to a stub 44 along a perforation 46. Duplicate front page 42 has areas of written or printed material 48, 50, and image-receiving areas 52, 54, which correspond to written or printed areas 10, 12, and image-receiving areas 14, 16, respectively, on original front page 4. Likewise, duplicate back page 56 has areas of written or printed material 58, 60, and image-receiving areas 62, 64, which correspond to written or printed areas 20, 22, and image-receiving areas 24, 26, respectively, on original back page 18.

A second carbon sheet 66 is provided immediately behind and aligned with duplicate sheet 43. The side of carbon sheet 66 adjacent duplicate sheet 43 is provided with exposed carbon areas 72, 74 and blank areas 76, 78. Exposed carbon areas 72, 74 are disposed on carbon sheet 66 so as to encompass and correspond to image-receiving areas 24, 26 on original back page 18, for transferring pressure-created images formed on image-receiving areas 24, 26. As shown in FIG. 3, the other side of carbon sheet 66 has exposed carbon area 80, 82 and blank areas 84, 86. Exposed carbon areas 80, 82 encompass and correspond to image-receiving areas 14, 16 on original front page 4, for transferring pressure-created images formed on image-receiving areas 14, 16.

The final sheet in the manifold form assembly is a second duplicate sheet 89, containing a second duplicate front page 88 and a second duplicate back page 102. Duplicate sheet 89 is detachably connected to a stub 90 along a perforation 92. Second duplicate front page 88 has areas of written or printed material 94, 96, and image-receiving areas 98, 100 corresponding to written or printed areas 10, 12 and image-receiving areas 14, 16 on original front page 4. Likewise, second duplicate back page 102 has areas of written or printed material 104, 106, and image-receiving areas 108, 110, which correspond to written or printed areas 20, 22 and image-receiving areas 24, 26 on original back page 18.

Staples 112 or any connecting medium, such as glue, are provided to connect sheets 5, 43, and 89 together at their stubs, to form a composite stub detachably connected to the top edge of each sheet. Carbon sheets 28 and 66 are connected into the composite stub along their top edges by the staples 112 or other connecting medium. The composite stubs act as a binder, to form an integral form assembly in which each sheet is securely fastened together. Sheets may be removed as desired by detaching the sheet from the assembly at its individual perforation.

Figure 4:
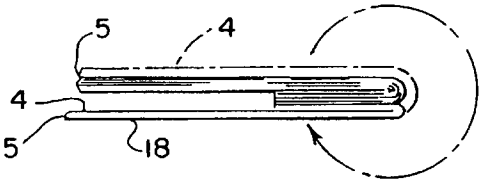

As shown in FIGS. 1 and 4, sheet 5 is movable from a first position in which original front page 4 is exposed, to a second position in which original back page 18 is exposed. The first position is as shown in FIG. 1, where the phantom lines show how sheet 5 is moved to attain the second position. This movement is done manually by the user, after original front page 4 has been filled out. The user lifts sheet 5 and forms a fold at perforation 8, then folds the entire stub over at the perforations 32, 46, 70, and 92. This series of steps places sheet 5 in the second position, in which original back page 18 is exposed for completion, as shown in FIG. 4. When so positioned, original front page 4 is immediately adjacent duplicate back page 102. Sheet 5 is positioned so as to be aligned with each other sheet in both the first and second positions.

FIG. 5 shows manifold form assembly 2 with first sheet 5 in its first position, wherein front page 4 is exposed for completion. As shown in FIG. 5, sheet 5 is a carbonless CB (Coated Back) sheet, meaning that one side is coated with a pressure sensitive carbonless dye 114, as is well known. In typical applications, a CB sheet is positioned so that the dye coating 114 is on the back of the sheet, for transferring images created on the front of the sheet. In form assembly 2, however, CB sheet 5 is placed in the assembly such that dye coating 114 is on the front of the sheet when sheet 5 is in the first position. When so positioned, as shown in FIG. 5, dye coating 114 faces upwardly, and image-receiving areas 14 and 16 receive images formed on original front page 4.

Second duplicate sheet 89 is a carbonless CF (Coated Front) sheet, meaning that one side is coated with a reactive, image receptive coating 116 to receive images transferred by a pressure sensitive carbonless dye coating, as is well known. When sheet 5 is in its second position, as shown in FIG. 6, the dye coating 114 of CB sheet 5 is placed immediately adjacent receptor coating 116 of CF sheet 89, thus forming a carbonless image-transferring system. Pressure-created images formed on original back page 18 cause dye coating 114 and receptor coating 116 to interact, to transfer pressure-created images formed on image-receiving areas 24, 26 of original back page 18 to image-receiving areas 108, 110 of duplicate back page 102.

It can thus be seen that a two-sided original is provided on sheet 5 by completing original front page 4 with sheet 5 in its first position, then moving sheet 5 to its second position and completing original back page 18. Pressure-created images are transferred from original sheet 5 to duplicate sheets 43 and 89 by carbon sheets 66 and 28, as well as by the carbonless image-transferring system formed by the interaction of carbonless dye coating 114 and carbonless receptor coating 116. Copies of the original document of sheet 5 are thus provided on duplicate sheets 43 and 89.

It should be appreciated that the image-transferring function performed by cabon sheets 28 and 66 may also be performed by a carbonless image-transferring system. In such a system, sheets 5, 43, and 89 have selected areas of carbonless CB dye coating and of image receptive CF coating for transferring pressure-created images formed on the image-receiving areas. For example, to transfer images formed on image-receiving area 14 of sheet 5 to image-receiving area 52 of duplicate sheet 43, a CB coating is provided on the back of sheet 5 corresponding to image-receiving area 14 and a CF coating is provided on the front of sheet 43 corresponding to image-receiving area 14. Similarly, a CB coating is provided on the back of sheet 43 and a CF coating on the front of sheet 89, both corresponding to image-receiving area 14, to transfer such images to image-receiving area 98 of sheet 89. Such a carbonless system eliminates the need for carbon sheets 28 and 66.

Figure 2:
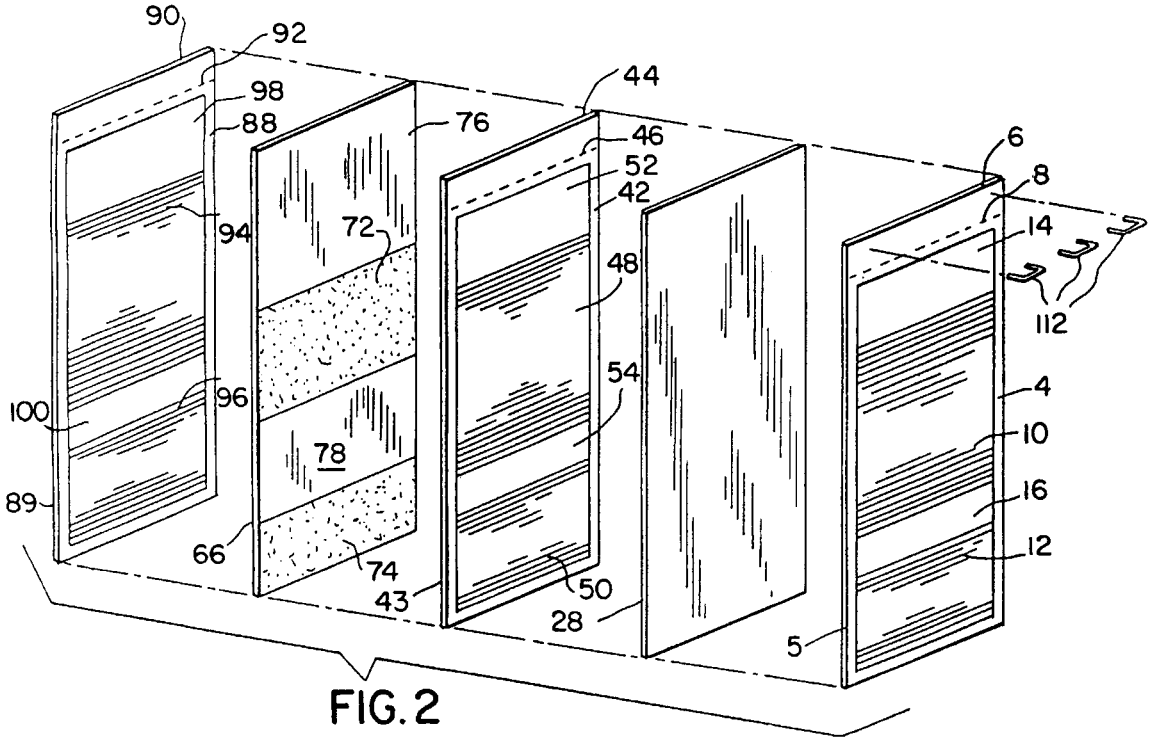

It is also possible to eliminate some components of the form assembly so that it is unnecessary to move any of the sheets to complete the back page. To accomplish this end, the front and back pages to be completed by the user are on separate sheets. Referring to FIGS. 2 and 3, the components eliminated in this arrangement are carbon sheet 18 and duplicate sheet 43. Thus, the necessary elements are first sheet 5, carbon sheet 66, and duplicate sheet 89. Carbon sheet 66 is provided immediately behind and aligned with sheet 5, and duplicate sheet 89 is behind and aligned with carbon sheet 66.

The user first completes original front page 4 of sheet 5 as above, by forming pressure-crated images on image-receiving areas 14, 16 of front page 4. The images are transferred to image-receiving areas 98, 100 of duplicate sheet 89 by carbon areas 80, 82 of carbon sheet 66. Then, instead of flipping sheet 5 to expose back page 18 for completion, the user simply flips the entire form over, thus exposing duplicate back page 102 for completion. Duplicate back page 102, being adapted to receive original pressure-created images when so exposed for completion, then essentially becomes the original back page. The user then completes duplicate back page 102 by forming pressure-created images on image-receiving areas 108, 110 of back page 102. The images are transferred to image-receiving areas 24, 26 or original back page 18 by carbon areas 72, 74 of carbon sheet 66. In this manner original back page 18, being adapted to receive pressure-created images transferred by carbon sheet 66, then essentially becomes the duplicate back page.

The original pressure-created images are thus disposed on separate sheets, with the other side of each sheet carrying copies of the original images. This arrangement eliminates the need for providing a carbonless image-transferring system, but is useful primarily when a two-page single-sheet original is not required.

As noted above, the image-transferring function performed by carbon sheet 66 may be performed by a carbonless system. In such a system, sheets 5 and 89 are provided with selected areas of carbonless CB and CF coatings corresponding to the image-receiving areas for transferring pressure-created images formed thereon.

With reference to FIG. 7, an alternate embodiment of the form system of the present invention includes a first sheet 120 having an original front page 122 disposed on one side thereof. First sheet 120 is detachably connected to a stub portion 124 along a perforation 126. Original front page 122 may be a business form or the like having written or printed material thereon or, as shown in FIG. 7, may be a blank page for receiving images formed such as by writing or typing along its entire length.

Referring to FIG. 8, an original back page 128 is provided on the other side of first sheet 120. Original back page 128 may also have areas of written or printed material thereon, or, as shown, may be a blank sheet for receiving images formed such as by writing or typing along its entire length.

A first carbon sheet 130 is provided directly behind and aligned with first sheet 120. The front side of carbon sheet 130 adjacent original back page 128 has no exposed carbon areas. As shown in FIG. 8, the back side of carbon sheet 130 is provided with a pressure sensitive carbon coating 134. Carbon coating 134 is provided on the entire back surface of first carbon sheet 130, and acts to transfer pressure-created images formed on original front page 122. First carbon sheet 130 has a stub 136 formed along perforations 138 at its upper edge.

A first duplicate sheet 140 is positioned behind and aligned with first carbon sheet 130 and first sheet 120. Second sheet 140 has a duplicate front page 142 on one side and a duplicate back page 144 on the other side. If written or printed material is contained on original front page 122 and original back page 128, then duplicate front and back pages 142, 144 will likewise contain such written or printed material so as to duplicate original front and back pages 122, 128. However, as shown in FIGS. 7 and 8, duplicate front and back pages 142, 144 are blank so as to correspond to original front and back pages 122, 128, respectively. Duplicate sheet 140 is detachably connected to a stub 146 along a perforation 148.

A second carbon sheet 150 is provided immediately behind and aligned with duplicate sheet 140. Second carbon sheet 150 is essentially identical to first carbon sheet 130, having no exposed carbon areas on its front side 152 and a carbon coating 154 provided on its back side to transfer pressure-created images formed on original front page 122. Second carbon sheet 150 is detachably connected along its upper edge to a stub 156 along a perforation 158.

The final sheet in the manifold form assembly according to the alternate embodiment is a second duplicate sheet 160, containing a second duplicate front page 162 and a second duplicate back page 164. Second duplicate sheet 160 is detachably connected along its upper edge to a stub 166 along a perforation 168. Again, second duplicate front and back pages 162, 164 are identical to first duplicate sheets 142, 144 in that they are blank so as to correspond to original front and back pages 122, 128, respectively.

Staples 166 or any connecting medium, such as glue, are provided to connect sheets 120, 130, 140, 150 and 160 together at their stub portions to form a composite stub detachably connected to the top edge of each sheet. The composite stub acts as a binder, to form an integral form assembly in which each sheet is fastened together. Sheets may be removed as desired by detaching the sheet from the assembly at its individual perforation.

As shown in FIGS. 1 and 10, the front sheet is movable from a first position in which the original front page is exposed, to a second position in which the original back page is exposed. The form assembly shown in FIGS. 7–10 is usable in the same manner as the assembly shown in FIGS. 1–6, wherein the first sheet can be flipped over stub to attain the second position in which the original back page is exposed for completion. The series of steps followed to expose the original back page 128 for completion is described above.

FIG. 9 shows the manifold form assembly with the original first sheet 120 in its first position, wherein original front page 122 faces upwardly for receiving pressure-created images. As shown in FIG. 9, first sheet 120 is a carbonless CB (Coated Back) sheet meaning that one side is coated with a pressure sensitive carbonless dye coating 170, as is well known. As in the previously described embodiment, CB sheet 120 is placed in the form assembly such that dye coating 170 is on front page 122 of first sheet 120 when sheet 120 is in its first position. When so positioned, as shown in FIG. 9, dye coating 170 faces upwardly and is disposed along the entire length and surface of original front page 122.

With further reference to FIG. 9, and referring to the sheets in order from top to bottom as shown, first carbon sheet 130 having carbon coating 134 on its backside is disposed below first sheet 120 when sheet 120 is in its first position. First duplicate sheet 140 is positioned below first carbon sheet 130, and is a carbonless CF (Coated Front) sheet, meaning that its underside coated with a reactive, image receptive coating 172, as is well known. Second carbon sheet 150 having carbon coating 154 on its underside is disposed below first duplicate sheet 140. Second duplicate sheet 160 is disposed beneath second carbon sheet 150. Second duplicate sheet 160 has a carbonless CF coating 174 on its underside and a carbonless CB coating 176 on its top side.

When desired, the user fills out original front page 122 of first sheet 120 by forming pressure-created images thereon, such as by writing or typing. Images are formed on front page 122, and the carbon coatings 134, 154 provided on the back sides of carbon sheets 130, 150, respectively, serve to transfer such pressure-created images from first sheet 120 to first duplicate front page 142 of first duplicate sheet 140 and to second duplicate front page 162 on second duplicate sheet 160.

After original front page 122 is completed and it is desired to complete original back page 128, first sheet 120 is moved from its first position, shown in FIG. 9, to its second position, shown in FIG. 10. The sequence of steps followed to accomplish such change of position of first sheet 120 has been detailed previously. Thereafter, carbon sheets 130 and 150 are removed from the form assembly along their perforations 138, 158, respectively. Alternately, carbons sheets 130 and 150 may be removed prior to moving the first sheet 120 to its second position. The form assembly, with carbon sheets 130 and 150 removed, is shown in FIG. 10 with first sheet 120 in its second position and the form assembly turned over so as to expose original back page 124 for completion. In this position, original back page 128 faces upwardly for receiving pressure-created images. The rightward end of FIG. 10 shows a detail of the composite stub when front sheet 120 is moved to its second position and flipped to expose original back page 124 for completion, and after removal of first and second carbon sheets 130, 150.

With first sheet 120 in its second position and carbon sheets 130, 150 removed, a carbonless image-transferring system is set up between the remaining sheets of the form assembly. As shown in FIG. 10, original back page 124 is now exposed for completion, and first and second duplicate back pages 144, 164, respectively face upwardly as does original back page 124. A carbonless image-transferring system is formed by CB coating 170 on original front page 122 and CF coating 174 provided on second duplicate back page 164. The interaction of these carbonless CF and CB coatings is as explained previously, so as to transfer pressure-created images from original back page 124 to second duplicate back page 164. Similarly, a carbonless system is provided between first and second duplicate sheets 140, 160 by carbonless CB coating 176 on the underside of second duplicate sheet 160 and by carbonless CF coating 172 on the upper side of first duplicate sheet 140. In this manner, pressure-created images are transferred through the form assembly to first duplicate back page 144.

It is to be appreciated that any number of additional duplicate sheets can be provided in the form assembly described, so as to provide a like number of two-sided duplicates of the original two-sided document.

It should also be appreciated that the form assembly is not limited to the employment of the particular described image-transferring system. Any satisfactory and suitable image-transferring means may be employed for transferring pressure-created images from the original front and back sheets to the duplicate front and back sheets.

Various modes for carrying out the invention are contemplated as being within the scope of the following claims particularly pointing out and distinctly claiming the subject matter which is regarded as the invention.

I claim:

[1. An integral manifold form assembly for providing a completed two-sided original document and a completed copy of the original document, comprising:

an original front page disposed on one side of a first sheet, said original front page having at least one image-receiving area disposed thereon.

an original back page disposed on the other side of said first sheet, said original back page having at least one image-receiving area disposed thereon;

pressure sensitive image-transferring means integral with the form assembly for transferring pressure-created images formed on said original front page image-receiving area and on said original back page image-receiving area;

a duplicate of said original front page integral with the form assembly, said duplicate front page having at least one image-receiving area disposed thereon corresponding substantially to said original front page image-receiving area;

a duplicate of said original back page integral with the form assembly, said duplicate back having at least one image-receiving area disposed thereon corresponding substantially to said original back page image-receiving area; and binder means for connecting said first sheet, said duplicate front page, said duplicate back page, and said image-transferring means into an integral form assembly, said assembly being adapted to accommodate movement of said first sheet between a first position in which said original front page is exposed and a second position in which said original back page is exposed, so that pressure-created images formed on said original front page image-receiving area are transferred to said duplicate front page image-receiving area by said image-transferring means when said first sheet is in said first position, and pressure-created images formed on said original back page image-receiving area are transferred to said duplicate back page image-receiving area by said image-transferring means when said first sheet is in said second position, for providing a completed original front page and a completed original back page on said first sheet, and for providing a copy of said original front page on said duplicate front page and a copy of said original back page on said duplicate back page.]

[2. The internal manifold form assembly of claim 1, wherein said duplicate front page and said duplicate back page are disposed on opposite sides of a second sheet integral with said manifold form assembly, so as to provide a two-sided duplicate of said first sheet on said second sheet.]

[3. The integral manifold form assembly of claim 2, wherein said pressure sensitive image-transferring means for transferring pressure-created images formed on said original front page to said duplicate front page when said first sheet is in said first position comprises an image-transferring sheet disposed between said first and second sheets and having image-transferring material on one side thereof for transferring images from said original front page to said duplicate front page.]

[4. The integral manifold form assembly of claim 2, wherein said pressure sensitive image-transferring means for transferring pressure-created images formed on said original back page to said duplicate back page when said first sheet is in said second position comprises a carbonless image-transferring means.]

[5. The integral manifold form assembly according to claim 4, wherein said carbonless image-transferring means comprises a pressure sensitive carbonless coating disposed on said original front page and a carbonless receptor means for receiving pressure-created images transferred by said carbonless coating disposed on said duplicate back page, so that when said first sheet is placed in said second position to expose said original back page, and said original front page is thereby placed immediately adjacent said duplicate back page, pressure-created images formed-on said original back page image-receiving area are transferred to said duplicate back page image-receiving area by the interaction of said pressure-sensitive carbonless coating with said carbonless receptor means in response to the forming of said pressure-created images on said original back page image-receiving area.]

[6. The integral manifold form assembly according to claim 2, further comprising one or more additional duplicate sheets substantially identical to said second sheet disposed within said form assembly to provide a plurality of completed two-sided copies of said original document, and wherein said pressure-sensitive image-transferring means comprises one or more image-transferring sheets disposed in the form assembly so that one said image-transferring sheet is adjacent each said duplicate sheet, said image-transferring sheets having a pressure-sensitive image-transferring material disposed thereon for transferring pressure-created images formed on said original front page image-receiving area to said duplicate front page image-receiving area when said first sheet is in said first position, and wherein said image-transferring sheets are removable so that said image-transferring sheets are removed from said form assembly when said first sheet is in said second position so as to expose said original back page, and further comprising a pressure sensitive carbonless image-transferring means disposed between said original and duplicate back pages when said first sheet is in said second position and said image-transferring sheets are removed for transferring pressure-created images formed on said original back page of said first sheet to said duplicate back pages.]

[7. The integral manifold form assembly according to claim 6, wherein said pressure sensitive carbonless image-transferring means disposed between said original and duplicate back pages when said first sheet is in said second position and said image-transferring sheets are removed comprises a pressure-sensitive carbonless coating disposed on said original and duplicate front pages and a carbonless receptor means disposed on said duplicate back pages for receiving pressure-created images transferred by said carbonless coating when said first sheet is in said second position, so that pressure-created images formed on said original back page image-receiving area are transferred to said duplicate back page image-receiving areas by the interaction of said pressure sensitive carbonless coating with said carbonless receptor means.]

[8. A method of providing an original two-sided document and one or more copies of said original two-sided document, comprising the steps of:

providing a first sheet having an original front page disposed on one side thereof and an original back page disposed on the other side thereof, said first sheet being movable between a first position in which said original front page is exposed and a second position in which said original back page is exposed;

providing a duplicate front page;

providing a duplicate back page;

providing a first pressure sensitive image-transferring means between said original front page and said duplicate front page when said first sheet is in said first position;

providing a second image-transferring means between said original back page and said duplicate back page when said first sheet is in said second position;

providing a binder means for forming said first sheet, said duplicate front page, said duplicate back page, said first pressure sensitive image-transferring means and said second image-transferring means into an integral form assembly, said binder means being adapted for accommodating movement of said first sheet from said first position to said second position;

positioning said first sheet in said first position so as to expose said original front page;

forming pressure-created images on said original front page, whereby said pressure-created images are transferred to said duplicate front page by said first image-transferring means;

positioning said first sheet in said second position so as to exposed said original back page; and forming pressure-created images on said original back page, whereby said pressure-created images are transferred to said duplicate back page by said second image-transferring means.]

[9. The method according to claim 8, wherein said steps of providing said duplicate front and back pages comprises providing a second sheet, with said duplicate front page being disposed on one side of said second sheet and said duplicate back page being disposed on the other side of said second sheet, so as to provide a two-sided duplicate of said first sheet.]

[10. The method according to claim 9, wherein said step of providing said first pressure sensitive image-transferring means between said original front page and said duplicate front page when said first sheet is in said first position comprises providing an image-transferring sheet disposed between said first and second sheets and having an image-transferring material on one side thereof for transferring images from said original front page to said duplicate front.]

[11. The method according to claim 9, wherein the step of providing said second pressure sensitive image-transferring means between said original back page and said duplicate back page when said first sheet is in said second position comprises providing a carbonless image-transferring means disposed between said first and second sheets.]

[12. The method according to claim 11, wherein said step of providing said carbonless image-transferring means comprises providing a pressure sensitive carbonless coating on said original front page and providing a carbonless receptor means on said duplicate back page for receiving pressure-created images transferred by said carbonless coating, so that when said first sheet is placed in said second position to expose said original back page, and said original front page is thereby placed adjacent said duplicate back page, pressure-created images formed on said original back page are transferred to said duplicate back page by the interaction of said pressure sensitive carbonless coating with said carbonless receptor means in response to the forming of said pressure-created images on said original back page.]

[13. The method according to claim 9, further comprising the steps of:

providing one or more additional duplicate sheets substantially identical to said second sheet disposed within said form assembly to provide a plurality of completed two-sided copies of said original document; and providing one or more image-transferring sheets in said form assembly so that one said image-transferring sheet is adjacent each said duplicate sheet, said image-transferring sheets having a pressure sensitive image-transfemng material disposed thereon for transfemng pressure-created images formed on said original front page image-receiving area to said duplicate front page image-receiving areas when said first sheet is in said first position;

removing said image-transferring sheets prior to forming pressure-created images on said original back page when said first sheet is in said second position so as to expose said original back page; and providing a pressure sensitive carbonless image-transferring means between said original back page and said duplicate back pages when said first sheet is in said second position and said image-transferring sheets are removed for transferring pressure-created images formed on said original back page of said first sheet to said duplicate back pages.]

[14. The method according to claim 13, wherein said step of providing said pressure sensitive carbonless image-transferring means between said original back page and said duplicate back pages when said first sheet is in said second position and said image-transferring sheets are removed comprises providing a pressure sensitive carbonless coating on said original and duplicate front pages and a carbonless receptor means on said duplicate back pages for receiving pressure-created images transferred by said carbonless coating when said first sheet is in said second position, so that pressure-created images formed on said original back page image-receiving area are transferred to said duplicate back page image-receiving areas by the interaction of said pressure sensitive carbonless coating with said carbonless receptor means.]

*15. An integral manifold form assembly for providing a completed two-sided original document and a completed copy of the original document, comprising:*

*a first sheet having a front surface and a back surface, the front surface and the back surface each having one or more image-receiving areas thereon for receiving original pressure-created images, the first sheet being movable between a first position in which its front surface is exposed and a second position in which its back surface is exposed:*

*one or more duplicate sheets each having a front surface and a back surface, the front surface and the back surface each having one or more image-receiving areas disposed thereon substantially corresponding in location to the first sheet front and back surface image-receiving areas, wherein the front surface of a first duplicate sheet is located immediately adjacent the first sheet back surface when the first sheet is in its first position, and the back surface of an outermost duplicate sheet facing the front surface of the first sheet when the first sheet is in its second position;*

*one or more removable pressure-sensitive image-transferring carbon sheets each having a front surface and a back surface, wherein image-transferring carbon material is disposed throughout substantially the entire surface area of the back surface of each image-transferring carbon sheet, wherein the image-transferring sheets are disposed between the back surface of the first sheet and the front surface of the first duplicate sheet, when the first sheet is in its first position, and between the back and front surfaces, respectively, of the remaining duplicate sheets;*

*binder means for connecting the first sheet, the one or more duplicate sheets, and the one or more image-transferring carbon sheets together into an integral form assembly for accommodating movement of the first sheet between its first and second positions wherein the first sheet and the one or more duplicate sheets are in substantial alignment when the first sheet is in its first and second positions, and wherein the one or more image-transferring carbon sheets are adapted to be removed from the binder means after the first sheet front surface has been completed and prior to forming pressure-created images on the first sheet back surface; and pl a carbonless pressure-sensitive image-transferring system for transferring pressure-created images formed on the first sheet back surface to the back surface of each of the one or more duplicate sheets when the first sheet is in its second position, comprising: a first pressure-sensitive carbonless coating on the front surfaces of the first sheet, the outermost duplicate sheet and the remaining duplicate sheets; and a second pressure-sensitive carbonless coating on the back surfaces of the outermost duplicate sheet and the remaining duplicate sheets, wherein the first and second carbonless coatings face each other when the first sheet is in its second position and the one or more image-transferring sheets are removed;*

*wherein the one or more image-transferring carbon sheets transfer pressure-created images to the front surfaces of the one or more duplicate sheets, when the first sheet is in its first position, and the first and second carbonless coatings transfer images to the back surfaces of the one or more duplicate sheets when the first sheet is in its second position and the one or more image-transferring sheets are removed, for providing a completed original document on the first sheet and a copy of the original document on at least one duplicate sheet.*

* * * * *

UNITED STATES PATENT AND TRADEMARK OFFICE

CERTIFICATE OF CORRECTION

PATENT NO. : Re.35,273

DATED : June 11, 1996

INVENTOR(S) : GARY J. THOMPSON

It is certified that error appears in the above-identified patent and that said Letters Patent is hereby corrected as shown below:

In The Claims

Claim 15, Col. 12, Line 28, delete "pl" and insert a new paragraph.

Signed and Sealed this

Fifteenth Day of October, 1996

*Attest:*

Bruce Lehman

BRUCE LEHMAN

*Attesting Officer*

*Commissioner of Patents and Trademarks*